US008016604B2

(12) United States Patent
Matsumoto et al.

(10) Patent No.: US 8,016,604 B2
(45) Date of Patent: Sep. 13, 2011

(54) CHARGING CONNECTOR

(75) Inventors: Mitsuhiro Matsumoto, Shizuoka (JP); Hajime Kato, Shizuoka (JP); Suminori Arima, Shizuoka (JP); Shinji Ichikawa, Aichi (JP); Atsushi Mizutani, Aichi (JP)

(73) Assignees: Yazaki Corporation, Tokyo (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/936,975

(22) PCT Filed: Nov. 13, 2009

(86) PCT No.: PCT/JP2009/069367
§ 371 (c)(1),
(2), (4) Date: Oct. 8, 2010

(87) PCT Pub. No.: WO2010/058742
PCT Pub. Date: May 27, 2010

(65) Prior Publication Data
US 2011/0034053 A1    Feb. 10, 2011

(30) Foreign Application Priority Data

Nov. 21, 2008  (JP) ................................. 2008-298491

(51) Int. Cl.
*H01R 13/62* (2006.01)
(52) U.S. Cl. ...................................................... 439/304
(58) Field of Classification Search .................. 439/304, 439/305, 372, 310; 320/109
See application file for complete search history.

(56) References Cited

U.S. PATENT DOCUMENTS 5,627,448 A * 5/1997 Okada et al. ................... 439/133
6,225,153 B1 * 5/2001 Neblett et al. ................. 438/188

FOREIGN PATENT DOCUMENTS

| JP | 6-310207 | 11/1994 |
| JP | 9-161898 | 6/1997 |
| JP | 2004-303581 A1 | 10/2004 |
| JP | 2007-236172 | 9/2007 |

OTHER PUBLICATIONS

International Search Report for International Application No. PCT/JP2009/069367 dated Nov. 27, 2009.

* cited by examiner

*Primary Examiner* — Phuong K Dinh
(74) *Attorney, Agent, or Firm* — Kratz, Quintos & Hanson, LLP

(57) ABSTRACT

To provide a charging connector to prevent the charging connector from removing while a lock system is locked by helping a user recognize that 5 the lock system is locked. A charging connector B including: a lever 44 received in a connector case main body 23, and of which center part is pivotally supported; a locking claw 45b integrally formed with one end of the lever 44; and a release button 46a disposed at the other end of the lever 44, wherein 10 when the charging connector B is completely fitted into a secondary battery-side connector, the locking claw 45b is locked with a locking projection 19 provided at the secondary battery-side connector, and wherein when the release button 46a is pushed down, the locking between the locking claw and the locking projection is unlocked, and the charging connector B further including: a lock 15 system 100 having a lock device 101; and an operation regulator 102 which is moved to a preventing position to prevent the release button 46a from being pushed down when the lock device 101 is in a locking state, and moved to an allowing position to allow the release button 46a to be pressed down when the lock device 101 is in an unlocking state.

5 Claims, 11 Drawing Sheets

CHARGING CONNECTOR

TECHNICAL FIELD

This invention relates to a charging connector for connecting to a secondary battery-side connector connected to a secondary battery, in particular, to a charging connector to be connected to a secondary battery-side connector connected to the secondary battery mounted on a vehicle or the like for charging the secondary battery.

BACKGROUND

While problems related to environment, energy or the like are exposed, an electric vehicle having a low environmental load, and good energy efficiency is attracting a lot of attention. As one type of such an electric vehicle, there is an electric vehicle equipped with a secondary battery such as a nickel hydride battery or a lithium-ion battery and powered by an electrical energy stored in the secondary battery.

In such an electrical vehicle equipped with the secondary battery, it is necessary to charge the secondary battery. For charging the secondary battery, the secondary battery is connected to a charger which generates voltage and current suitable for charge based on an electric power supplied from a commercial power source or the like, and controls charging time and the like. By providing a secondary battery-side connector connected to the secondary battery on an electric vehicle main body, and by providing a charging connector to be connected to the secondary battery-side connector on the charger, a connection between the secondary battery and the charger becomes easy. Thereby, a user of the electric vehicle can easily charge the second battery.

However, due to characteristics of the second battery, a long time is needed for charging the second battery. Therefore, the user may leave a charging place, and there is a fear that a vicious person may pull out the charging connector from the secondary battery-side connector. A suggestion for solving such a problem is described in Patent Document 1.

As shown in FIGS. 10 and 11, a charging connector 720 suggested in the Patent Document 1 includes: a rectangular frame-shaped grip 721; a connector main body 722 having a cylindrical inner case 723; and a charging cable 720a extracted from a lower part of the grip 721, and connected to a not-shown charger. A cylindrical sleeve 726 shorter than the inner case 723 is attached to an outer circumference of the inner case 723 of the connector main body 722 in a manner that the sleeve 726 is immovable in an axial direction of the inner case 723, and rotatable around the inner case 723. When the connector main body 722 is inserted into a vehicle-side connector 710 as the secondary battery-side connector, the sleeve 726 is positioned at an outside of a cylindrical guiding tube 711 mounted on the vehicle side-connector 710. Further, an engaging pin 727 is projected inward on an inner circumference at a tip end of the sleeve 726, and engageable with a spiral groove 714 formed on the guiding tube 711. When the engaging pin 727 and the spiral groove 714 are engaged with each other, the connector main body 722 and the vehicle side-connector 710 are connected to each other.

Further, the charging connector 720 includes: a lock system 730 as a cylinder lock which can be locked and unlocked by an ignition key of an electric vehicle; and a locking rod 732 to be inserted into a locking notch 734 formed on the sleeve 726 in response to locking and unlocking of the lock system 730. When the locking rod 732 is inserted into the locking notch 734, the locking rod 732 prevents the sleeve 726 from rotating, and when the locking notch 734 is removed from the locking notch 734, the locking rod 732 allows the sleeve 726 to rotate. Namely, a locking mechanism is composed of the lock system 730, the locking rod 732, and the locking notch 734. Further, when the lock system 730 is locked while the engaging pin 727 and the spiral groove 714 are engaged with each other, the locking rod 732 is inserted into the locking notch 734 to prevent the sleeve 726 from rotating, so that the connector main body 722 and the vehicle side-connector 710 are held in a state that the connector main body 722 and the vehicle side-connector 710 are connected to each other, namely, in a locking state, thereby the charging connector 720 is prevented from being removed from the vehicle side-connector 710.

Patent Document 1: JP, A, H06-310207

DISCLOSURE OF THE INVENTION

Problem to be Solved by the Invention

However, because the above-described charging connector 720 does not include a device for indicating the locking state for a user, it is hard to recognize whether the lock system is locked or unlocked. Therefore, there is a problem that the user may try to remove the charging connector 720 from the vehicle side-connector 710 without knowing that the lock system is locked.

An object of the present invention is to solve the above-described problem. Namely, an object of the present invention is to provide a charging connector to prevent the charging connector from removing while a lock system is locked by helping a user recognize that the lock system is locked.

Means for Solving Problem

For attaining the object, the invention described in claim 1 is a charging connector comprising:

a connector case main body;

a lever received in the connector case main body, and of which center part is pivotally supported;

a locking claw integrally formed with one end of the lever; and a release button disposed at the other end of the lever, wherein when the charging connector is completely fitted into a secondary battery-side connector connected to a secondary battery, the locking claw is locked with a locking projection provided at the secondary battery-side connector, and wherein when the release button is pushed down, the lever is rotated around a shaft supporting point to release the locking between the locking claw and the locking projection, and the charging connector further comprising:

a lock system having a lock device attached to the connector case main body, and an operation regulator which is moved to a preventing position to prevent the release button from being pushed down when the lock device is in a locking state, and moved to an allowing position to allow the release button to be pressed down when the lock device is in an unlocking state.

The invention described in claim 2 is, in the invention described in claim 1, characterized in that the lock device is a cylinder lock operable to be unlocked by an ignition key of a vehicle.

The invention described in claim 3 is, in the invention described in claim 1, the charging connector described in claim 1, wherein the lock device is a biometric lock including: a biological data input into which biological data is inputted;

and a biological data memory in which biological data for verifying to be checked against the biological data inputted in the biological data input is previously stored, and wherein the lock device is configured to be unlocked when the biological data inputted in the biological data input is checked against the biological data for verifying stored in the biological data memory, and they are matched.

The invention described in claim 4 is, in the invention described in claim 1, characterized in that the lock device is a dial lock including: a dial into which a code is inputted; and a code memory in which a checking code for checking against the code inputted in the dial is previously stored, and to be unlocked when the code inputted in the dial is checked against the checking code stored in the code memory, and they are matched.

The invention described in claim 5 is, in the invention described in any one of claims 1 to 4, characterized in that a locking wall of the locking claw abutting on the locking projection when the locking claw is locked with the locking projection is formed less than a right angle relative to a fitting direction to the secondary battery-side connector, and in that the locking claw and the shaft supporting point of the lever are respectively arranged along the fitting direction when the locking claw is locked with the locking projection.

According to the invention described in claim 1, when the charging connector is completely fitted into the secondary battery-side connector, the locking claw is locked with the locking projection provided at the secondary battery-side connector. Therefore, the charging connector is prevented from moving in a direction to removing from the secondary battery-side connector (namely, a puffing-out direction). Further, when the release button is pushed down, the lever is rotated around the shaft supporting point, and the locking between the locking claw and the locking projection is unlocked. Therefore, when the release button is pushed down, the charging connector is allowed to move in the puffing-out direction. Namely, for puffing-out the charging connector from the secondary battery-side connector, it is necessary to push down the release button. Further, the charging connector includes the lock system having a lock device attached to the connector case main body, and an operation regulator which is moved to a preventing position to prevent the release button from being pushed down when the lock device is in a locking state, and moved to an allowing position to allow the release button to be pressed down when the lock device is in an unlocking state. Therefore, when the lock device is in the locking state, the operation regulator is moved to the preventing position and the release button is prevented from being pushed down, and when the lock device is in the unlocking state, the operation regulator is moved to the allowing position and the release button is allowed to be pushed down. Namely, when the lock device is in the locking state, the release button cannot be pushed down.

According to the invention described in claim 2, the lock device is unlocked by the ignition key of a vehicle.

According to the invention described in claim 3, the lock device is unlocked by inputting the biological data indicating a physical feature such as fingerprint, vein, iris or the like.

According to the invention described in claim 4, the lock device is unlocked by inputting the code composed of such as a plurality of numbers.

According to the invention described in claim 5, the locking wall of the locking claw abutting on the locking projection when the locking claw is locked with the locking projection is formed less than a right angle relative to a fitting direction to the secondary battery-side connector (namely, the puffing-out direction). Therefore, when a force is applied in the puffing-out direction, the locking wall is not displaced and removed from the locking projection, and the locking between the locking claw and the locking projection is maintained. Further, the locking claw and the shaft supporting point of the lever are respectively arranged along the fitting direction (namely, the pulling-out direction) when the locking claw is locked with the locking projection. Therefore, when a force is applied in the puffing-out direction, the lever is not rotated.

Effects of Invention

As described the above, according to the invention described in claim 1, it is necessary to push down the release button when removing the charging connector from the secondary battery-side connector. Further, when the lock device is in the locking state, the release button cannot be pushed down. Therefore, when a user tries to remove the charging connector while the lock device is in the locking state, the user cannot push down the release button. Thereby, the user recognizes that the charging connector is locked, and a pulling-out operation in the locking state is prevented.

According to the invention described in claim 2, the lock device is unlocked by the ignition key of a vehicle. Therefore, a person to unlock the lock device is limited to an owner of the ignition key. The charging connector is prevented from being removed from the secondary battery-side connector by anyone else having a malicious intent.

According to the invention described in claim 3, the lock device is unlocked by inputting the biological data indicating a physical feature. Therefore, a person to unlock the lock device is limited to a person having the biological data matching with the previously stored biological data for verifying. The charging connector is prevented from being removed from the secondary battery-side connector by anyone else having a malicious intent.

According to the invention described in claim 4, the lock device is unlocked by inputting the code. Therefore, a person to unlock the lock device is limited to a person knowing the previously stored checking code. The charging connector is prevented from being removed from the secondary battery-side connector by anyone else having a malicious intent.

According to the invention described in claim 5, when a force is applied in the puffing-out direction, the locking between the locking claw and the locking projection is maintained, and the lever is not rotated. Therefore, a stress generated by rotating the lever is not applied to the release button disposed at the other end of the lever, and the lock system having the operation regulator for preventing the release button from being pushed down. Therefore, the lock system is prevented from being damaged. For example, in the conventional charging connector 720 described above, when a force is applied to the charging connector 720 in the puffing-out direction, the engaging pin 727 of the sleeve 726 is moved along the spiral groove 714, and a rotating force is applied to the sleeve 726, so that the locking rod 732 may be damaged. Namely, a force is applied to the charging connector 720 in the puffing-out direction, a stress is applied to the lock system and the lock system may be damaged. Then, there is a problem that when the lock system is damaged, the locking state is released and the charging connector 720 can be removed from the vehicle side-connector 710. However, according to the present invention, the lock system is prevented from being damaged. Therefore, when a force is applied to the charging connector in the pulling-out direction, the locking state is maintained, and the charging connector is prevented from being removed from the secondary battery-side connector.

EXPLANATIONS OF LETTERS OR NUMERALS

Figure 1:
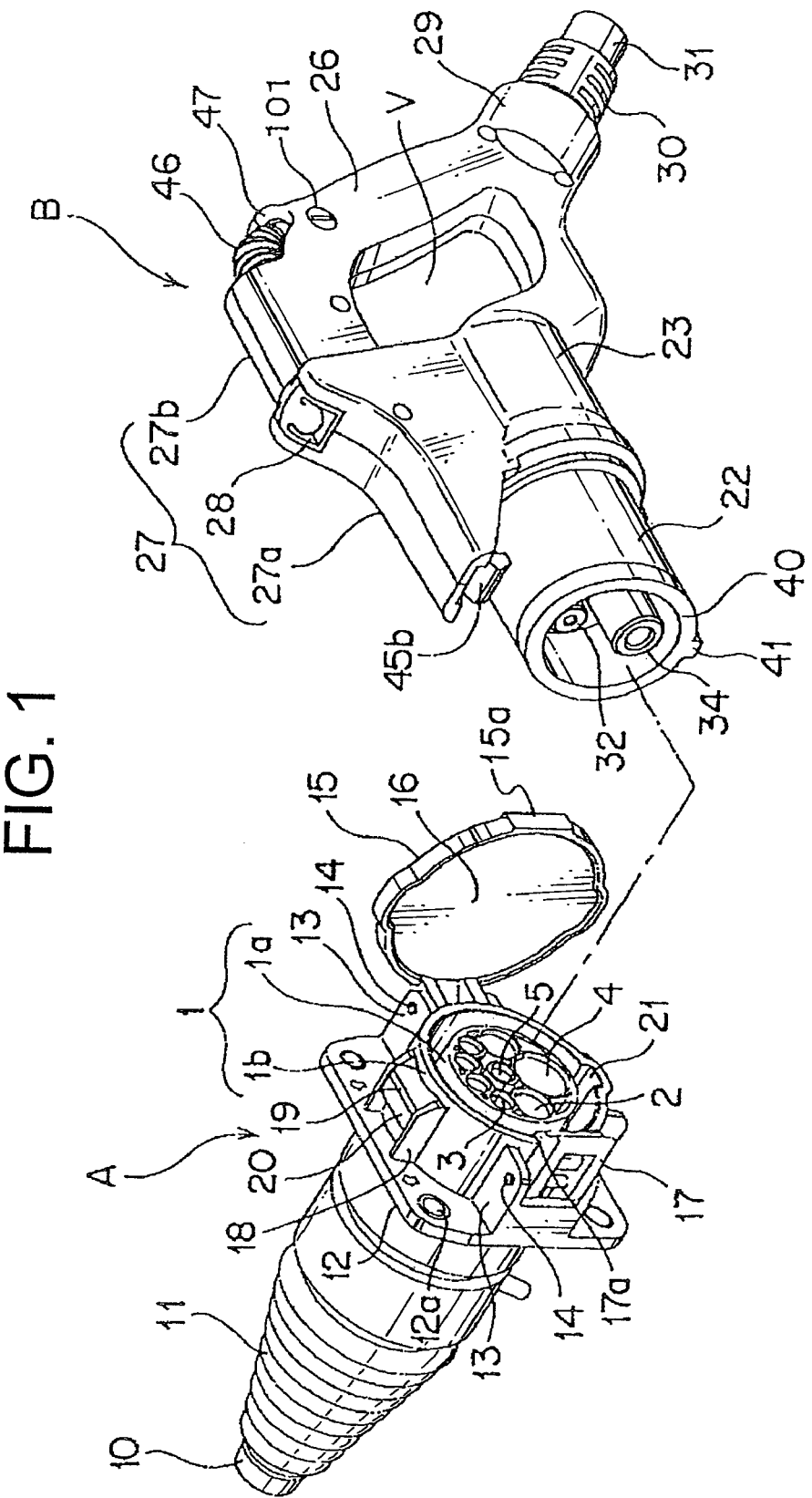
[FIG. 1] A perspective view showing a feeding-side connector according to an embodiment of the present invention.

A receiving-side connector (secondary battery-side connector)
B, B1, B2 feeding-side connector (charging connector)
19 locking projection
23 connector case main body
43 shaft (shaft supporting point)
44 lock lever (lever)
45 operational arm (one end of the lever)
45b locking claw
45c locking wall
46 operational arm (the other end of the lever)
46a pushing part (release button)
46b bottom surface of the pushing part
100 lock system
101 cylinder lock (lock device)
102 operation regulator
102A preventing position
102B allowing position
105 fingerprint lock (lock device, biometric lock)
105a fingerprint sensor (biological data input)
107 dial lock (lock device)
107a dial

BEST MODE FOR CARRYING OUT THE INVENTION

Figure 2:
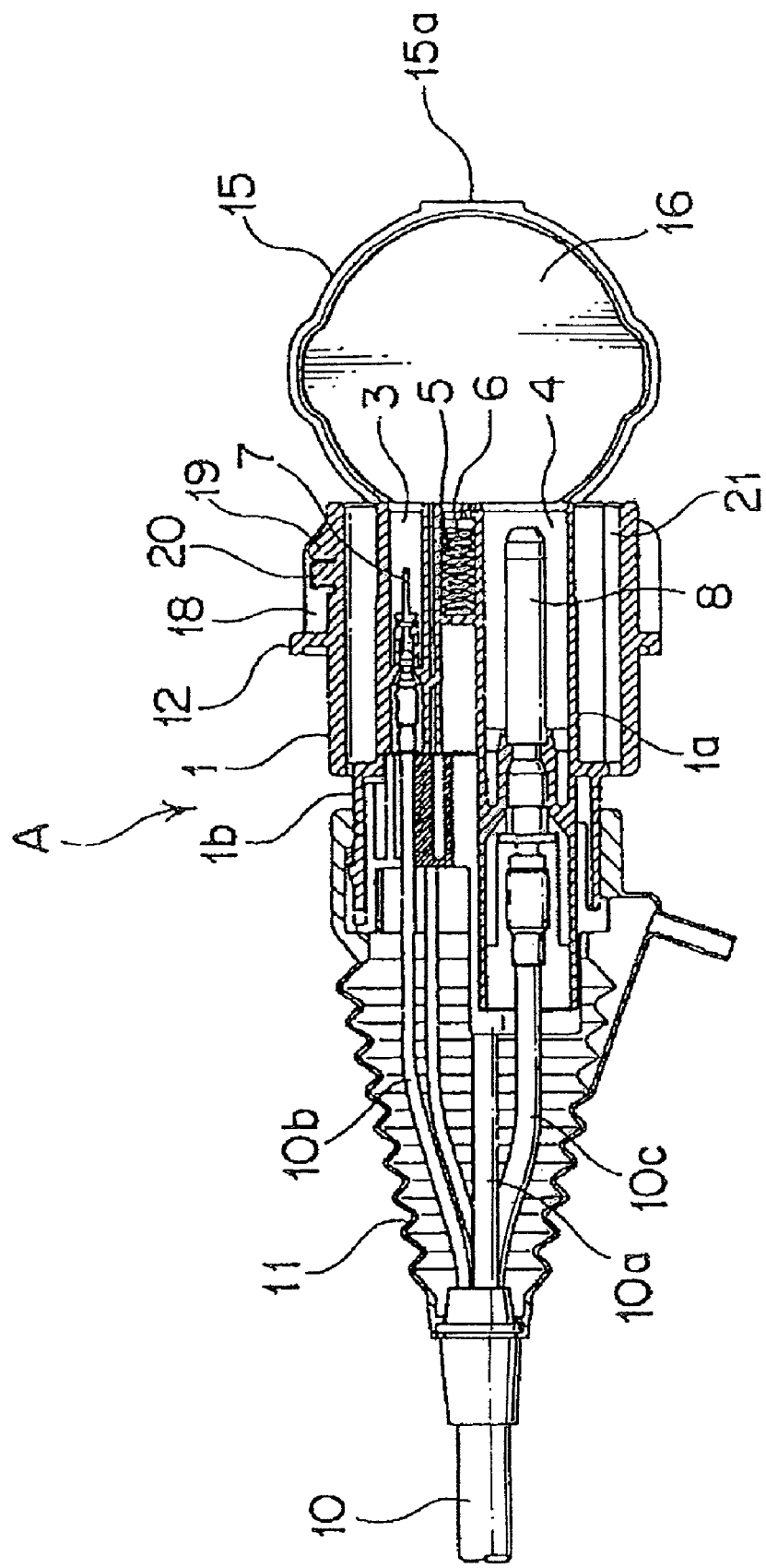
[FIG. 2] A vertically sectional view showing a receiving-side connector of FIG. 1.
Figure 3:
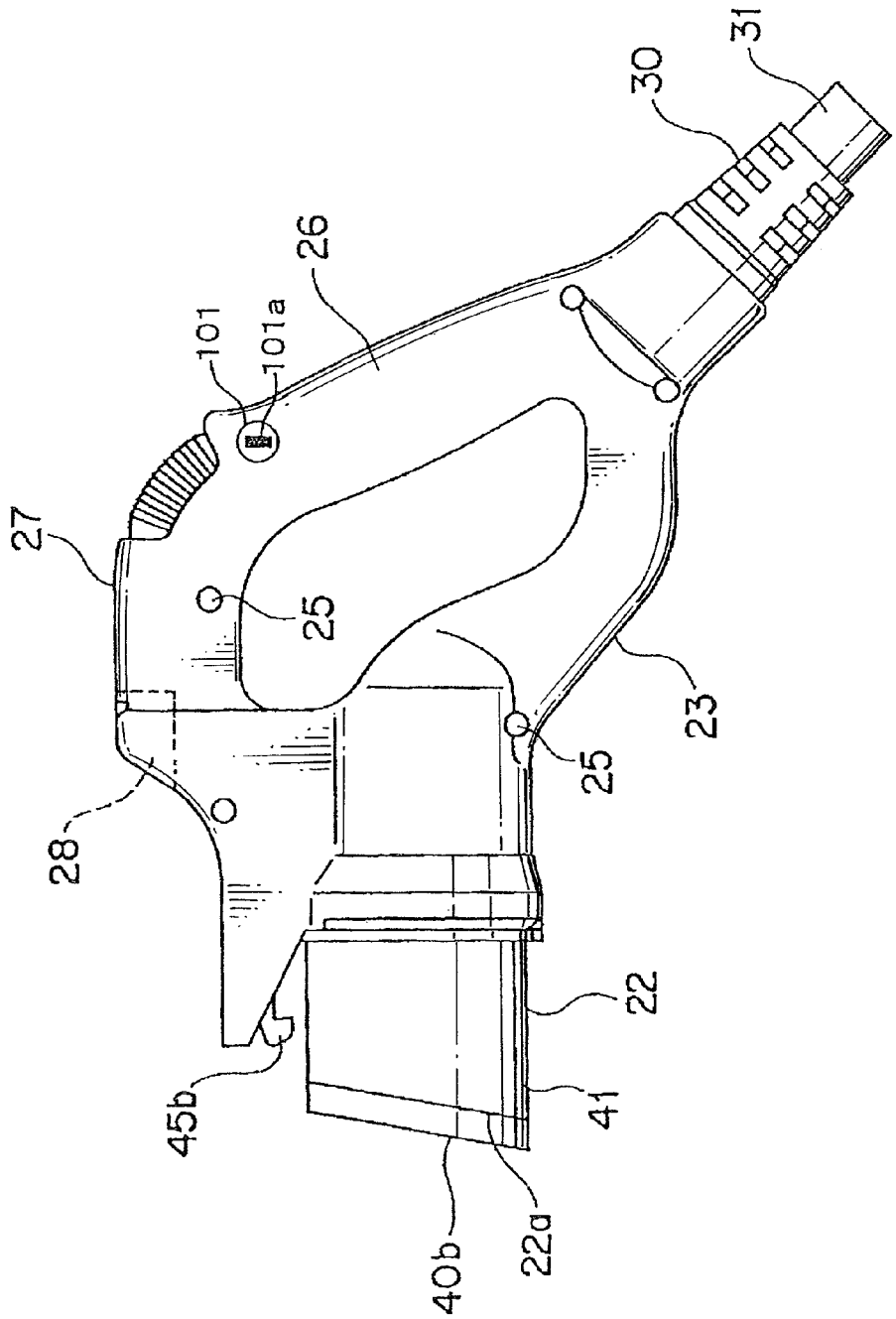
[FIG. 3] A front view showing the feeding-side connector of FIG. 1.
Figure 4:
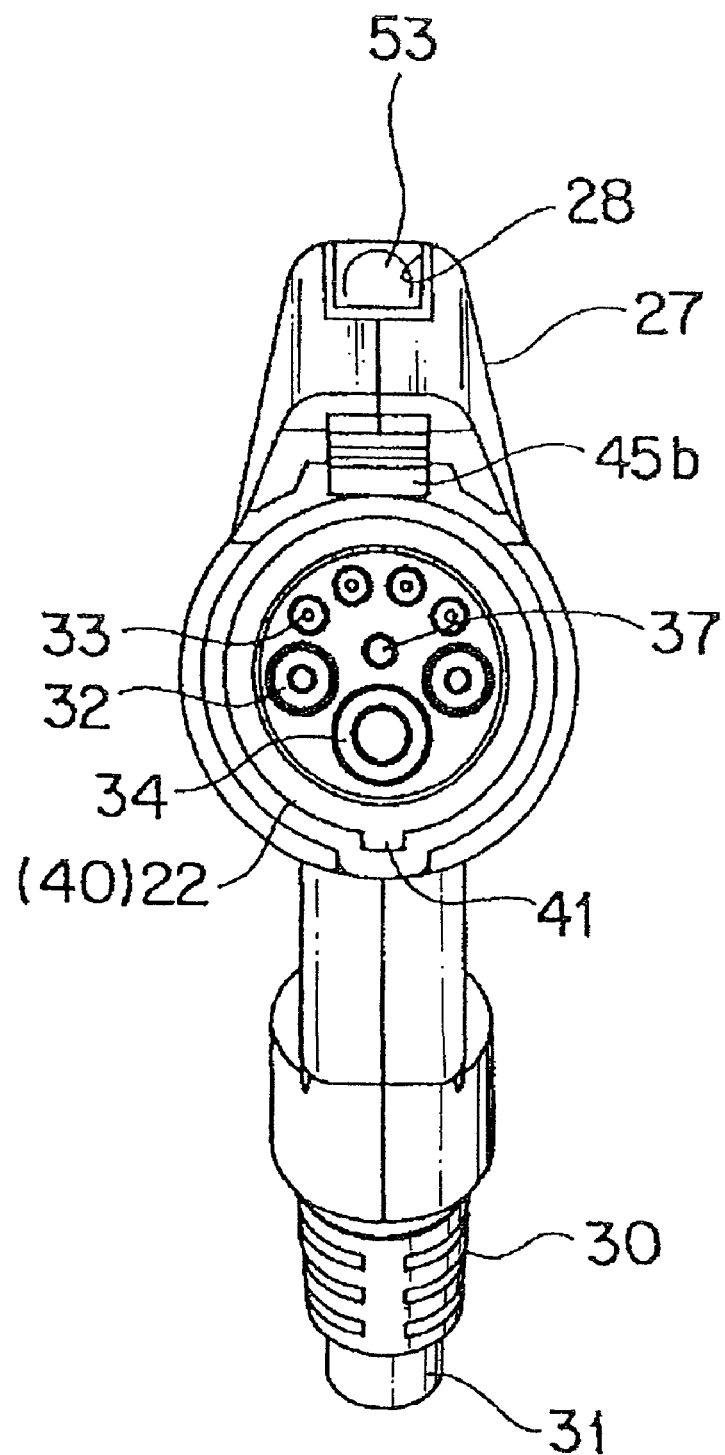
[FIG. 4] A left side view of FIG. 3

Hereinafter, an embodiment of a charging connector according to the present invention will be explained with reference to figures. In FIGS. 1 and 2, A indicates a receiving-side connector as a secondary battery-side connector mounted on a not-shown vehicle, and B indicates a feeding-side connector as a charging connector used for connecting to a not-shown charger.

The receiving-side connector A will be explained with reference to FIGS. 1 and 2. The receiving-side connector A is made of insulating synthetic resin, and includes a housing 1 formed in double-layered cylinders composed of an inner housing 1a and an outer housing 1b.

A plurality of terminal receiving chambers 2, 3, 4 each having a cylinder shape, and having a different radius are separately provided in an inside of the inner housing 1a, and a spring receiver 5 embedding a returning spring 6 is provided at the center of the inner housing 1a. This returning spring 6 pushes the feeding-side connector B in a returning direction (namely, the removing connection, and parallel to the fitting direction S) to facilitate a removal between the receiving-side connector A and the feeding-side connector B. A male charging terminal (not shown) connected to a battery as the secondary battery mounted on a vehicle, a male signal terminal 7 for displaying and controlling the state of charge, and a male ground terminal 8 are inserted into the receiving terminals 2, 3, 4. Lead wires 10a, 10b, 10c of a cable 10 are connected to the terminals, and guided out via a grommet 11 fixed to a rear end of the outer housing 1b. Incidentally, a configuration of the charging terminal is the same as that of the ground terminal 8 and the charging terminal is only a little smaller than the ground terminal 8. Therefore, a figure of the charging terminal is omitted.

A flange 12 having a bolt hole 12a is projected from a middle part of an outer circumference of the outer housing 1b for fixing to a vehicle body or the like. A pair of brackets 13, 13 is projected from both front sides of the flange 12 while clipping a front half of the outer housing 1b. A cap 15 open-closable with a pin shaft 14 is provided at one of the brackets 13, 13. A locking piece 17 rotatable with the pin shaft 14 is provided at the other of the brackets 13, 13. A striker plate 15a for engaging with a locking claw 17a at a tip end of the locking piece 17 is formed on the cap 15, and a seal packing 16 is stuck on an inner wall of the cap 15. When the cap 15 is closed to cover a tip end of the housing 1, the housing 1 is protected from dust and water upon non-use of the receiving-side connector A. A locking projection 19 clipped between a pair of protect and guide walls 18, 18 is provided on an upper wall in the front half of the outer housing 1b. A front part of the locking projection 19 is a sloped wall, and a rear part of the locking projection 19 is a vertical wall perpendicular to the fitting direction of the connectors. A metallic reinforcing piece 20 is fitted into a rear half of the locking projection 19 for wear protection. A guide groove 21 corresponding to a later-described guide projection 41 of the feeding-side connector B is formed along the fitting direction S on a lower wall of the front half of the outer housing 1b.

The feeding-side connector B will be explained with reference to FIGS. 3 to 7. As shown in FIG. 1, the feeding-side connector B includes: a connector housing 22 made of insulating synthetic resin; and a connector case main body (hereafter referred to as "case main body") 23 connected to a rear end of the connector housing 22.

The case main body 23 is composed of a pair of split mold cases 23a, 23b. Screw insertion holes 24 are formed on facing edges of the split mold cases 23a, 23b, and the case main body 23 is tightened and fixed with screws (nuts) 25. A grip 26 is formed via a space V at a rear side of the case main body 23. A lock lever receiving chamber 27 having an illumination chamber 28 is formed at a top side of the case main body 23. A cable connecting part 29 is formed at a bottom rear end of the case main body 23. A cable 31 is connected to the cable connecting part 29 via a cable protector 30.

Figure 5:
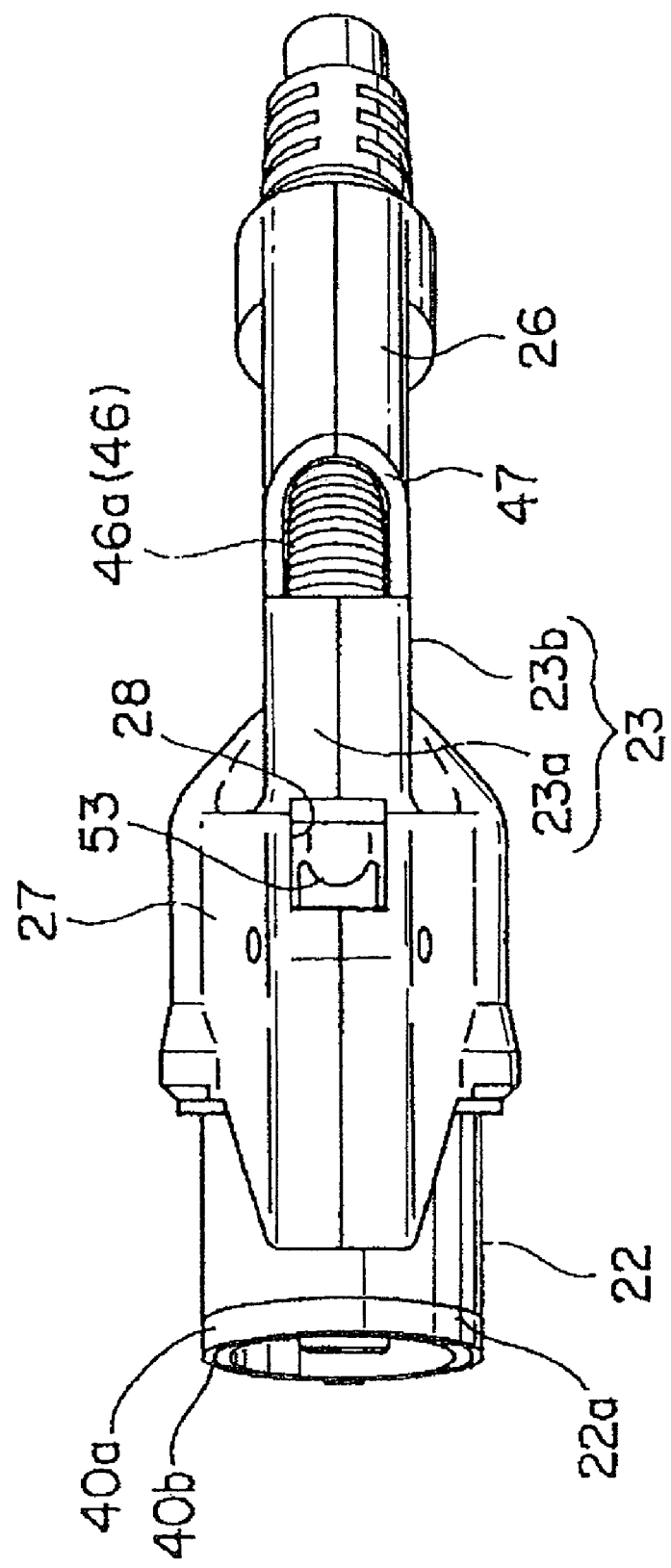
[FIG. 5] A plan view of FIG. 3
Figure 6:
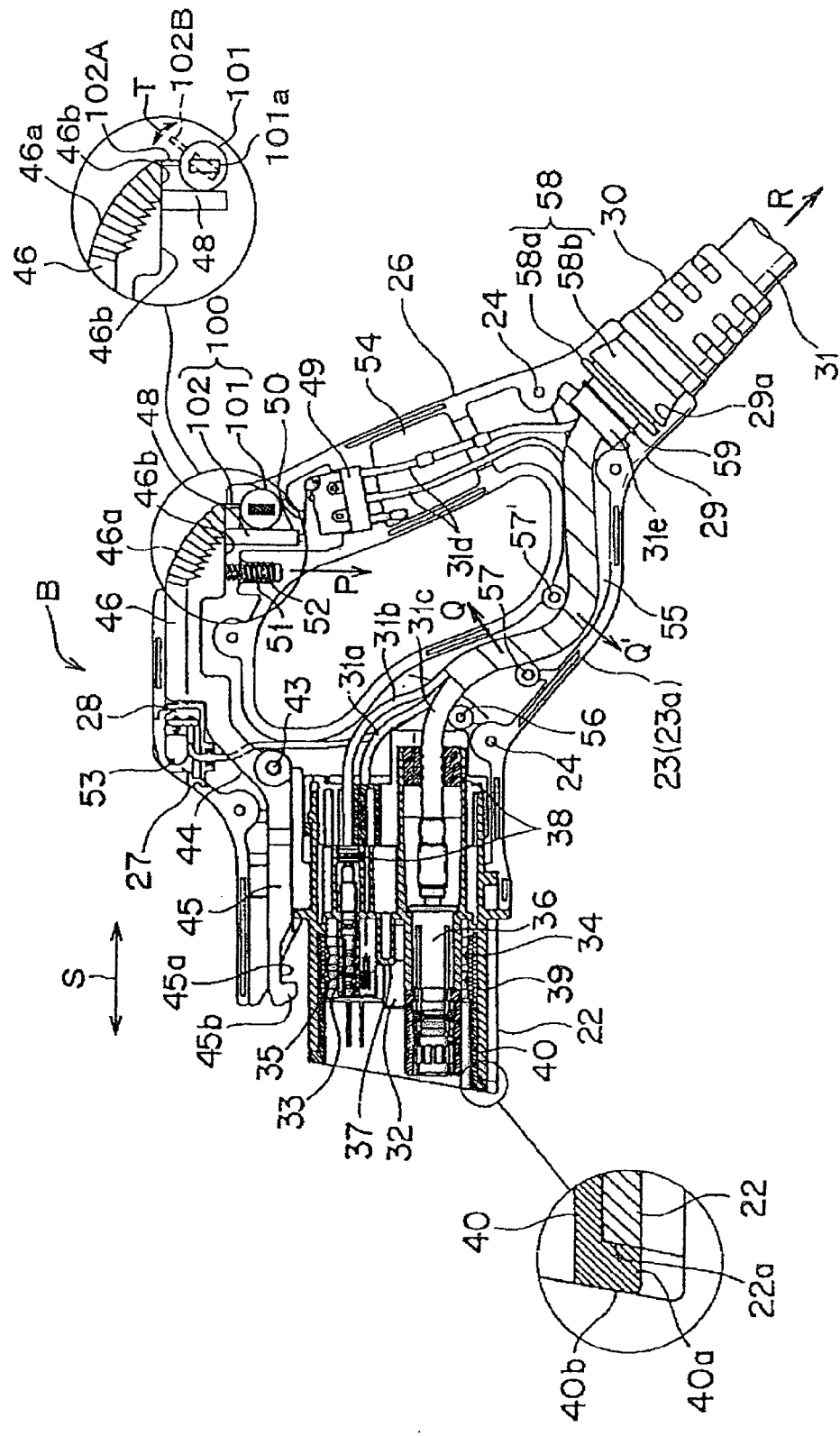
[FIG. 6] A vertically sectional view showing the feeing-side connector of FIG. 1.

The connector housing 22 is formed in a cylinder shape, and as shown in FIG. 5, a front end 22a of the connector housing 22 is a sloped wall of which lower part is longer than an upper part for an insertion guide of the receiving-side connector A. Terminal receiving chambers 32, 33, 34 to be respectively inserted into the terminal receiving chambers 2, 3, 4 of the receiving-side connector A are provided on an inside of the connector housing 22. Corresponding female charging terminal (not shown), female signal terminal 35, female ground terminal 36 are inserted and attached to the terminal receiving chambers 32, 33, 34. A pusher 37 corresponding to the returning spring 6 is provided at the center of the terminal receiving chambers 32, 33, 34. As it is clear from FIG. 6, tip ends of the female ground terminal 36 and its terminal receiving chamber 34 are further projected forward than those of the female signal terminal 35 and its terminal receiving chamber 33 (and the female charging terminal and its terminal receiving chamber 32). Waterproof rubber plugs 38 are respectively attached to the lead wires 31a, 31b, 31c of the cable 31, and the lead wires 31a, 31b, 31c are separately sealed and arranged in a later-described main cable path 55 of the case main body 23.

Further, a circular waterproof packing 39 having an even width is fitted to a rear half of an inner circumference of the connector housing 22, and a metallic packing holder 40 made of such as aluminum, iron or stainless steel is fitted into a front half thereof. Incidentally, a reinforced plastic having a strong shock resistance can be used instead of the metallic packing holder. According to a sloped front end 22a of the connector housing 22, a top of the packing holder 40 is narrow, and as the packing holder 40 extends to a bottom, a width of the packing holder 40 becomes wide. A circular projection 40a formed on an outer circumference of a tip end of the packing holder 40 covers the front end 22a to protect the front end 22a of the connector housing 22. In contrast, the guide projection 41 corresponding to the guide groove 21 is formed at a bottom part of the outer circumference of the connector housing 22.

In contrast, in the case main body 23, the upper lock lever receiving chamber 27 is composed of a front chamber 27a and a rear chamber 27b. An indicator lamp 53 composed of a two-color LED is attached to the illumination chamber 28 provided at a top of the lock lever receiving chamber 27.

Further, a lock lever 44 is rotatably supported by a shaft 43 (corresponding to the shaft supporting point in claims) in a middle of an inside of the lock lever receiving chamber 27. The lock lever 44 is made of metal such as aluminum, iron, stainless steel, or the like similar to the packing holder 40, and composed of a front side operational arm 45 (corresponding to one end of the lever in claims) and a rear side operational arm 46 (corresponding to the other side of the lever in claims).

Figure 7:
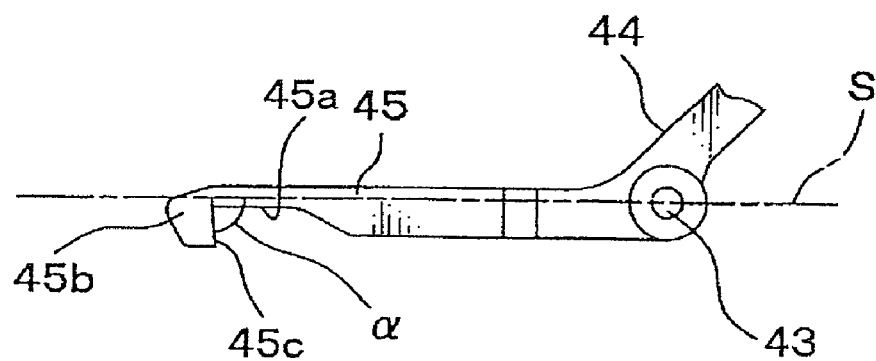
[FIG. 7] An enlarged view showing an operational arm of a lock lever included in the feeding-side connector of FIG. 1.

A tip end of the operational arm 45 is projected from the front chamber 27a and positioned adjacent to the outer circumference wall of the connector housing 22. A locking claw 45b is integrally formed via a concave 45a at an inside (connector housing 22 side) of the tip end of the operational arm 45. As shown in FIG. 7, a locking wall 45c facing the concave 45a and perpendicular to the fitting direction S is formed on the locking claw 45b. When the receiving-side connector A and the feeding-side connector B are completely fitted together, the locking wall 45c is closely overlapped with a vertical wall at a rear side of the locking projection 19 of the receiving-side connector A, so that the locking claw 45b is locked with the locking projection 19. Incidentally, an angle a between the locking wall 45c and the fitting direction S may be not more than 90 degree (right angle), and at this time, the vertical wall of the locking projection 19 has an angle with respect to the locking wall 45c to be closely overlapped with the locking wall 45c. Further, when the receiving-side connector A and the feeding-side connector B are completely fitted together, the locking claw 45b and the shaft 43 are arranged along the fitting direction S.

A rear end of the operational arm 46 is extended to a window 47 opened at an upper part of the grip 26 and an embossed pushing part 46a (corresponding to a release button in claims) integrally formed with the operational arm 46 is exposed from the window 47. A pushing piece 48 extended to a pathway 54 in the grip 26 is projected from the center of a bottom wall 46b of the pushing part 46a. A bottom end of the pushing piece 48 is adjacent to or contacts a switching spring 50 of a normally-closed micro switch 49. Further, an end of the bottom wall 46b is pressed upward by a coil spring 51 in a spring chamber 52, and the operational arm 45 is normally pressed downward (connector housing 22 side). Further, when the pushing part 46a is pushed down, the rear end of the operational arm 46 (namely, the other end of the lock lever 44) is moved downward, and the front end of the operational arm 45 (namely, one end of the lock lever 44) is moved upward. Namely, when the pushing part 46a is pushed down, the locking claw 45b provided at the tip end of the operational arm 45 is moved upward. Incidentally, in this embodiment, the pushing part 46a is integrally formed with the other end of the lock lever 44. However, the present invention is not limited to this. The pushing part 46a (namely, release button) may be separately formed from the lock lever 44 (namely, lever) and may be arranged at the other end of the lock lever 44 so that when the pushing part 46a is pushed down, the other end of the lock lever 44 may be moved downward.

A lock system 100 composed of a cylinder lock 101 and an operation regulator 102 is provided below the other end of the bottom wall 46b of the pushing part 46a. The cylinder lock 101 is a well-known cylinder-shaped lock device which is locked and unlocked by an ignition key of a vehicle on which the receiving-side connector A is mounted. A key insertion part 101a for inserting this ignition key is provided at one end of the cylinder lock 101. The cylinder lock 101 is attached to an upper side of the grip 26 of the case main body 23, while the key insertion part 101a is exposed outside from a front side of the case main body 23. The cylinder lock 101 is composed of a cylindrical cylinder case, and a cylinder part received in the cylinder case and rotated in a circumferential direction by only the ignition key.

The operation regulator 102 is a rod-shaped member made of synthetic resin, metal, or the like. The operation regulator 102 is arranged at the other end of the cylinder lock 101, and fixed to the cylinder part. A base end of the operation regulator 102 is fixed to a shaft center of the cylinder part, and a tip end of the operation regulator 102 is projected from an outer circumferential wall of the cylinder case. Namely, the tip end of the operation regulator 102 is moved along a circumferential direction T of the cylinder case in response to a rotation of the cylinder part. When the cylinder lock 101 is in a locking state, the tip end of the operation regulator 102 is moved to contact the other end of the bottom wall 46b of the pushing part 46a (position indicated by 102A in FIG. 6, namely, preventing position). When the cylinder lock 101 is in an unlocking position, the tip end of the operation regulator 102 is moved to far from the bottom wall 46b of the pushing part 46a (position indicated by 102B in FIG. 6, namely, allowing position). According to this, in the locking state, the pushing part 46a is prevented from being pushed down, and in the unlocking state, the pushing part 46a is allowed to be pushed down.

Further, in a lower side of the case main body 23, a main cable passage 55 communicating with the cable connecting part 29, and through which a plurality of lead wires 31a, 31b, 31c composing the cable 31 are guided, is composed of the pair of split mold cases 23a, 23b. A wire-supporting shaft 56 is projected in the main cable passage 55 adjacent to a rear end opening of the terminal receiving chamber 34 having the female ground terminal 36. The wire-supporting shaft 56 holds the lead wire 31c having a maximum radius and connected to the female ground terminal 36 in the center position of the main cable passage 55 near a rear end exit of the terminal receiving chamber 34. Thus, an inclination of the waterproof rubber plug 38 is prevented and degradation of waterproof performance is prevented.

The lead wire 31c together with the lead wires 31a, 31b are wrapped with a tape, and fixed by wire-fixing shafts 57, 57' interposed between the wire-supporting shaft 56 and the cable connecting part 29 for relaxing tension. Namely, the wire-fixing shafts 57, 57' are separated from each other with a proper gap, and projected opposed to each other toward the center of the main cable passage 55. Accordingly, the tape-wrapped lead wire 31c and the like are pressed in opposite directions indicated by arrows Q, Q' in FIG. 6 by the wire-fixing shafts 57, 57', and fixed in the main cable passage 55 in a curved shape. Therefore, direct tension from an outside is prevented or relaxed.

Further, these lead wires are guided out through a cable protector 30 attached to the cable connecting part 29 together with a lead wire 31d of the micro switch 49. The cable protector 30 includes a grommet 58 having a flange 58a at one end and a tapered tube 58b continued to the flange 58a. In the grommet 58, a terminal sheath 31e of the cable 31 extracted from the flange 58a is inserted into a C-shaped stop ring 59, and the tapered tube 58b is fitted into a tapered part 29a formed at an exit end of the cable connecting part 29. Accordingly, even if the cable 31 is pulled in a direction indicated by an arrow R in FIG. 6, because the tapered tube 58b is tightened by the tapered part 29a, the cable 31 is prevented from being displaced or pulled out. Thus, tension from an outside is prevented or relaxed from being applied to the lead wires 31a, 31b, 31c of the cable 31 due to the fixing and tightening of the grommet 58 of the cable protector 30 fixed to the cable connecting part 29, and due to pressure and frictional force in opposite directions of the wire-fixing shafts 57, 57', and the cable 31 is prevented from being pulled out.

A clear case 28a is fitted into the illumination chamber 28 at an upper side of the case main body 23. An indicator lamp 53 is set in an inside of the clear case 28a. A two-color LED composed of two light emitting diodes of green and red is used as the indicator lamp 53. For example, when standby, namely, when the cable 31 is connected to a charger (not shown), the one light emitting diode 53a emits green light. When charging, the other light emitting diode 53b emits red light.

The micro switch 49 configured to be engaged with the pushing piece 48 of the lock lever 44 is connected to a control circuit (safe pilot circuit) of a not-shown charger. The control circuit of a charger includes: a main switch; and a power-supplying relay. The micro switch 49 is connected in series to a control line of the main switch and the power-supplying relay. When the receiving-side connector A and the feeding-side connector B is completely fixed together, the main switch is turned "on" to close a contact point of the power-supplying relay, thereby a charging circuit (female charging terminal, male charging terminal, lead wires 10a, 31a) is energized.

Next, a fitting operation and a puffing-out operation of the feeding-side connector B will be explained. First, when the cable 31 is connected to a charger, a green light emitting diode of the indicator lamp in the illumination chamber 28 emits light. This green light illuminates front and top walls of the feeding-side connector B. Then, after the ignition key unlocks the cylinder lock 101, and the operation regulator 102 is moved to the allowing position 102B, the feeding-side connector B is fitted into the receiving-side connector A. Because the tip end of the connector housing 22 of the feeding-side connector B (tip end wall 40b of the packing holder 40) is sloped, it is easy to insert the tip end into a gap between the outer housing 1b and the inner housing 1a of the receiving-side connector A while holing the grip 26 with a hand. Further, when the guide projection 41 shown in a lower side of FIG. 1 is fitted and inserted into the guide groove 21 (see FIG. 1) of the receiving-side connector A, the feeding-side connector B is smoothly fitted into the receiving-side connector A.

In the middle of fitting the feeding-side connector B into the receiving-side connector A, the tip end of the inner housing 1a of the receiving-side connector A reaches the middle of the circular waterproof packing 39 in the feeding-side connector B, and at this point, the returning spring 6 does not contact the pusher 37. Accordingly, the feeding-side connector B is smoothly inserted into the receiving-side connector A, and the male ground terminal 8 firstly contacts the female ground terminal 36. Thereby, a whole charging circuit is grounded, so that an operator is protected from an electrical shock, and the receiving-side connector A and the feeding-side connector B are protected from a short-circuit damage.

At the same time as the grounding, the locking claw 45b of the front operational arm 45 of the lock lever 44 is moved on a front slope of the locking projection 19 of the receiving-side connector A. As the result, the rear operational arm 46 is pushed down as an arrow P of FIG. 6 against the coil spring 51. Thus, the pushing piece 48 pushes down the switching spring 50 of the normally-closed micro switch 49, and the micro switch 49 is turned "off". Therefore, if a main switch of the charger is "on" in the charger control circuit, the power-supplying relay is open, and the charging circuit is not energized.

When the feeding-side connector B is further inserted, the pusher 37 abuts on the returning spring 6, thereby hereafter the feeding-side connector B is inserted against a spring force of the returning spring 6. As is clear from figures, a connection between the male signal terminal 7 and the female signal terminal 35, and a connection between the male charging terminal and the female charging terminal are also started, a force for fitting the feeding-side connector B into the receiving-side connector A is gradually increased. However, because the locking claw 45b of the lock lever 44 is still moved on the rear side of the locking projection 19, the micro switch 49 remains "off" and the charging circuit is not energized. Further, if a user releases his hand from the grip 26 in this condition, owing to a spring back action of the returning spring 6, the feeding-side connector B is easily removed from the receiving-side connector A.

Then, when the feeding-side connector B is further pushed forward into the receiving-side connector A against the spring force of the returning spring 6, the receiving-side connector A and the feeding-side connector B are completely fitted together. Namely, the locking claw 45b is moved over the locking projection 19, and the lock lever 44 is resiliently returned by the coil spring 51. Thereby, the operational arm 45 of the locking claw 45b is closely overlapped with the vertical wall of the locking projection 19, and the locking claw 45b is locked with the locking projection 19, so that the feeding-side connector B is fixed to the receiving-side connector A. At this time, the locking claw 45b and the shaft 43 are arranged along the fitting direction S. At the same time, the male and female charging terminals, the male and female signal terminals 7, 35, and the male and female ground terminals 8, 36 are completely connected to each other. Then, because the lock lever 44 is resiliently returned, the switching spring 50 is released from pressing down by the pushing piece 48, thereby the micro switch 49 turns "on". Therefore, the power-supplying relay is closed in the charger control circuit, and the charging circuit is energized, so that the charging is able to start.

Thus, just when the receiving-side connector A and the feeding-side connector B become completely fitted together, the control circuit, namely, the safe pilot circuit becomes "on", and the charging becomes able to start. In the middle of fitting and before fitting, the control circuit is "off", and the charging may not be done in an unstable condition.

Then, the cylinder lock 101 is in the locking state with the ignition key, and the operation regulator 102 is moved to the preventing position 102A, thereby, the pushing part 46a is prevented from being pushed down.

It is extremely easy to remove (pull out) the feeding-side connector B from the receiving-side connector A. After the charging is completed, the cylinder lock 101 is in the unlocking state with the ignition key, and the operation regulator 102 is moved to the allowing position 102B, thereby, the pushing part 46a is allowed to be pushed down. Then, when the pushing part 46a of the operational arm 46 exposed from the window 47 of the grip 26 is pushed down with such as a thumb, the front operational arm 45 is easily lifted up owing to a pry action around the shaft 43, and the lock between the locking claw 45b and the locking projection 19 is unlocked. Then, because a spring-back force of the returning spring 6 is applied to the feeding-side connector B via the pusher 37, the feeding-side connector B is easily removed from the receiving-side connector A with a little force. While removing, the micro switch 49 is turned "off" similar to the middle of fitting, and the charging circuit is not energized.

When the cylinder lock 101 is in the locking state, the pushing part 46a is prevented from being pushed down with the operation regulator 102. Therefore, the lock between the locking claw 45b and the locking projection 19 is prevented from being unlocked, and the feeding-side connector B is prevented from being pulled out from the receiving-side connector A.

As explained above, when the feeding-side connector B is completely fitted into the receiving-side connector A, the locking claw 45b is locked with the locking projection 19 formed on the receiving-side connector A. Therefore, the feeding-side connector B is prevented from being moved in a direction pulling out from the receiving-side connector A (namely, a puffing-out direction). Further, when the pushing part 46a is pushed down, the lock lever 44 is rotated around the shaft 43, and the lock between the locking claw 45b and the locking projection 19 is unlocked. Therefore, when the pushing part 46a is pushed down, the feeding-side connector B is allowed to be moved in the puffing-out direction. Namely, when the feeding-side connector B is pulled out from the receiving-side connector A, it is necessary to push the pushing part 46a. Further, the lock system includes: the cylinder lock 101 attached to the case main body 23; and the operation regulator 102 which is moved to the preventing position 102A to prevent the pushing part 46a from being pushed down when the cylinder lock 101 is in the locking state, and moved to the allowing position 102B to allow the pushing part 46a to be pushed down when the cylinder lock 101 is in the unlocking state. Therefore, when the cylinder lock 101 is in the locking state, the operation regulator 102 is moved to the preventing position 102A, and the pushing part 46a is prevented from being pushed down. When the cylinder lock 101 is in the unlocking state, the operation regulator 102 is moved to the allowing position 102B, and the pushing part 46a is allowed to be pushed down. Namely, when the cylinder lock 101 is in the locking state, the pushing part 46a is prevented from being pushed down.

Further, the cylinder lock 101 of the feeding-side connector B is unlocked by the ignition key of a vehicle.

Further, in the feeding-side connector B, when the locking claw 45b is locked with the locking projection 19, an angle between the locking wall 45c of the locking claw 45b and the fitting direction S (namely, the pulling-out direction) with the receiving-side connector A is not more than right angle. Therefore, when a force is applied in the puffing-out direction, the locking wall 45c is not displaced and removed from the locking projection 19, and the locking between the locking claw 45b and the locking projection 19 is maintained. Further, the locking claw 45b and the shaft 43 of the lock lever 44 are respectively arranged along the fitting direction S (namely, the puffing-out direction) when the locking claw 45b is locked with the locking projection 19. Therefore, when a force is applied in the puffing-out direction, the lock lever 44 is not rotated.

According to the invention as described above, for puffing-out the feeding-side connector B from the receiving-side connector A, it is necessary to push down the pushing part 46a. Further, when the cylinder lock 101 is in the locking state, the pushing part 46a cannot be pushed down. Therefore, when a user tries to remove the feeding-side connector B while the cylinder lock 101 is in the locking state, the user cannot push down the pushing part 46a. Thereby, the user recognizes that the feeding-side connector B is locked, and a pulling-out operation in the locking state is prevented.

Further, the cylinder lock 101 is unlocked by the ignition key of a vehicle. Therefore, a person to unlock the cylinder lock 101 is limited to an owner of the ignition key. The feeding-side connector B is prevented from being puffing-out from the receiving-side connector A by anyone else having a malicious intent.

Further, when a force is applied in the puffing-out direction, the locking between the locking claw 45b and the locking projection 19 is maintained, and the lock lever 44 is not rotated. Therefore, a stress generated by rotating the lock lever 44 is not applied to the pushing part 46a disposed at the other end of the lock lever 44, and the lock system 100 having the operation regulator 102 for preventing the pushing part 46a from being pushed down. Therefore, the lock system 100 is prevented from being damaged. For example, in the conventional charging connector 720 described above, when a force is applied to the charging connector 720 in the puffing-out direction, the engaging pin 727 of the sleeve 726 is moved along the spiral groove 714, and a rotating force is applied to the sleeve 726, so that the locking rod 732 may be damaged. Namely, a force is applied to the charging connector 720 in the pulling-out direction, a stress is applied to the lock system and the lock system may be damaged. Then, there is a problem that when the lock system is damaged, the locking state is released and the charging connector 720 can be removed from the vehicle side-connector 710. However, according to the present invention, the lock system 100 is prevented from being damaged. Therefore, when a force is applied to the feeding-side connector B in the pulling-out direction, the locking state is maintained, and the feeding-side connector B is prevented from being removed from the receiving-side connector A.

Figure 8:
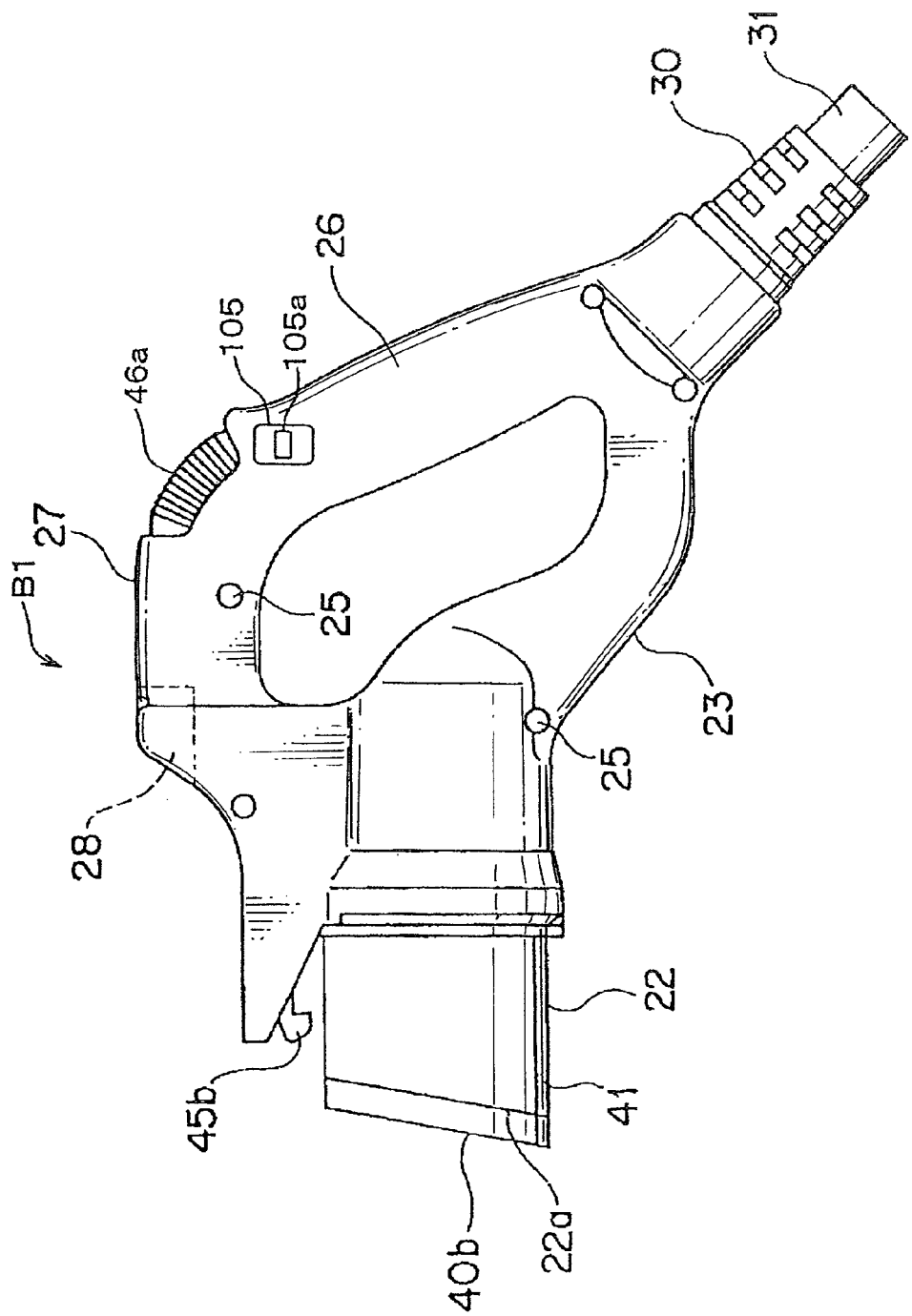
[FIG. 8] A front view showing a feeding-side connector according to another embodiment having a fingerprint lock as a lock device.

Incidentally, in the embodiment described above, the cylinder lock is used as the lock device. However, the present invention is not limited to this. For example, a fingerprint authentication lock including: a fingerprint sensor; and a fingerprint data memory in which fingerprint data for verifying to be checked against the fingerprint data inputted from the fingerprint sensor is previously stored, and to be unlocked when the finger print data inputted from the fingerprint sensor is checked against the fingerprint data for verifying stored in the fingerprint data memory, and they are matched may be used as the lock device. FIG. 8 shows a feeding-side connector B1 having such a fingerprint authentication lock.

As shown in FIG. 8, the feeding-side connector B1 includes: a fingerprint authentication lock 105 instead of the cylinder lock 101; and a not-shown linear actuator disposed at a lower side of the pushing part 46a having a cylinder main body fixed to the case main body 23 and an arm part projected from and retracted into the cylinder main body. The fingerprint authentication lock 105 is composed of a fingerprint sensor 105a into which fingerprint data is inputted, and a not-shown microcomputer (hereinafter referred to as "μCOM"). The μCOM includes a center processing unit (CPU), ROM and RAM, and is connected to the linear actuator. Fingerprint data of a car owner (namely, fingerprint data for verification) is previously stored (registered) in the ROM. The CPU of the μCOM monitors the energizing state of the charging circuit. When the feeding-side connector B1 and the receiving-side connector A is completely fitted together, and the charging circuit is started to be energized, the μCOM sends a signal to the linear actuator to project the arm part from the cylinder main body, and to make a tip end of the arm part abut on the bottom wall 46b of the pushing part 46a to prevent the pushing part 46a from being pushed down (namely, the locking state). Further, when the fingerprint data is inputted into the fingerprint sensor 105a, the CPU of the μCOM compares the inputted fingerprint data with the fingerprint data for verification stored in the ROM. When they are matched, the CPU sends a signal to the linear actuator to retract the arm part into the cylinder main body to remove the tip end of the arm part from the bottom wall 46b of the pushing part 46a to allow the pushing part 46a to be pushed down (namely, unlocking state). Incidentally, the fingerprint sensor 105a corresponds to the biological data input in claims. The linear actuator corresponds to the operation regulator in claims. The ROM in the μCOM corresponds to the biological data memory in claims. Further, the fingerprint data corresponds to the biological data in claims, and the fingerprint data for verification corresponds to the biological data for verification in claims.

Thus, the lock system includes the fingerprint authentication lock 105 as the lock device, and the fingerprint authentication lock 105 is unlocked by inputting the fingerprint data. Therefore, a person to unlock the fingerprint authentication lock 105 is limited to a person having the fingerprint data matching with the previously stored fingerprint data for verifying. The feeding-side connector B1 is prevented from being removed from the receiving-side connector A by anyone else having a malicious intent. Incidentally, other biometric authentication lock may be used other than the fingerprint authentication lock, for example, a vein authentication lock using a vein sensor, an iris authentication lock having an iris sensor or the like. Further, in the embodiment described above, the CPU monitors the energizing condition of the charging circuit to automatically make the lock in the locking state. However, the present invention is not limited to this. When the inputted fingerprint data is matched with the fingerprint data for verification stored in the ROM, the lock may become the locking state.

Figure 9:
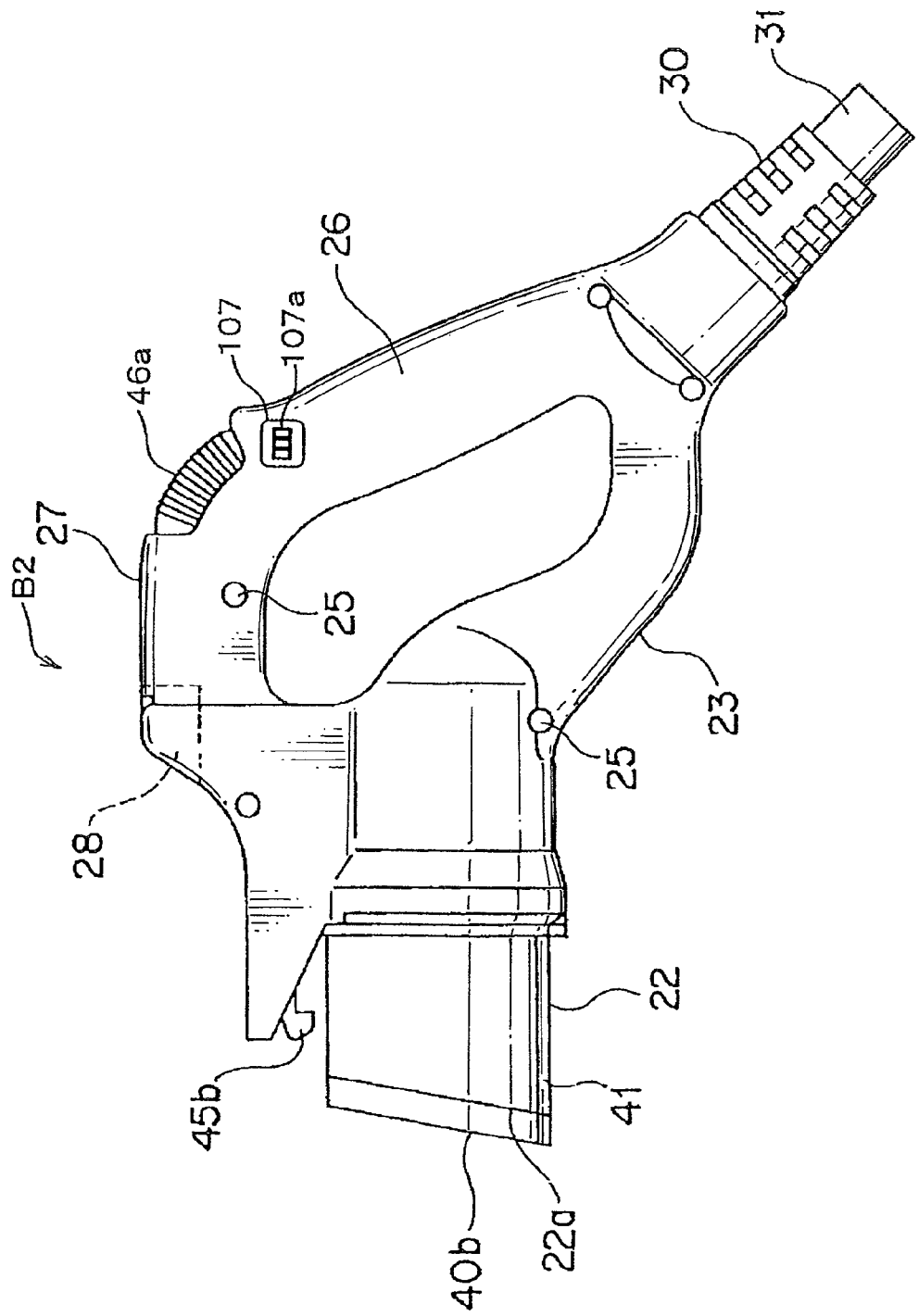
[FIG. 9] A front view showing a feeding-side connector according to the other embodiment having a dial lock as the lock device.
Figure 10:
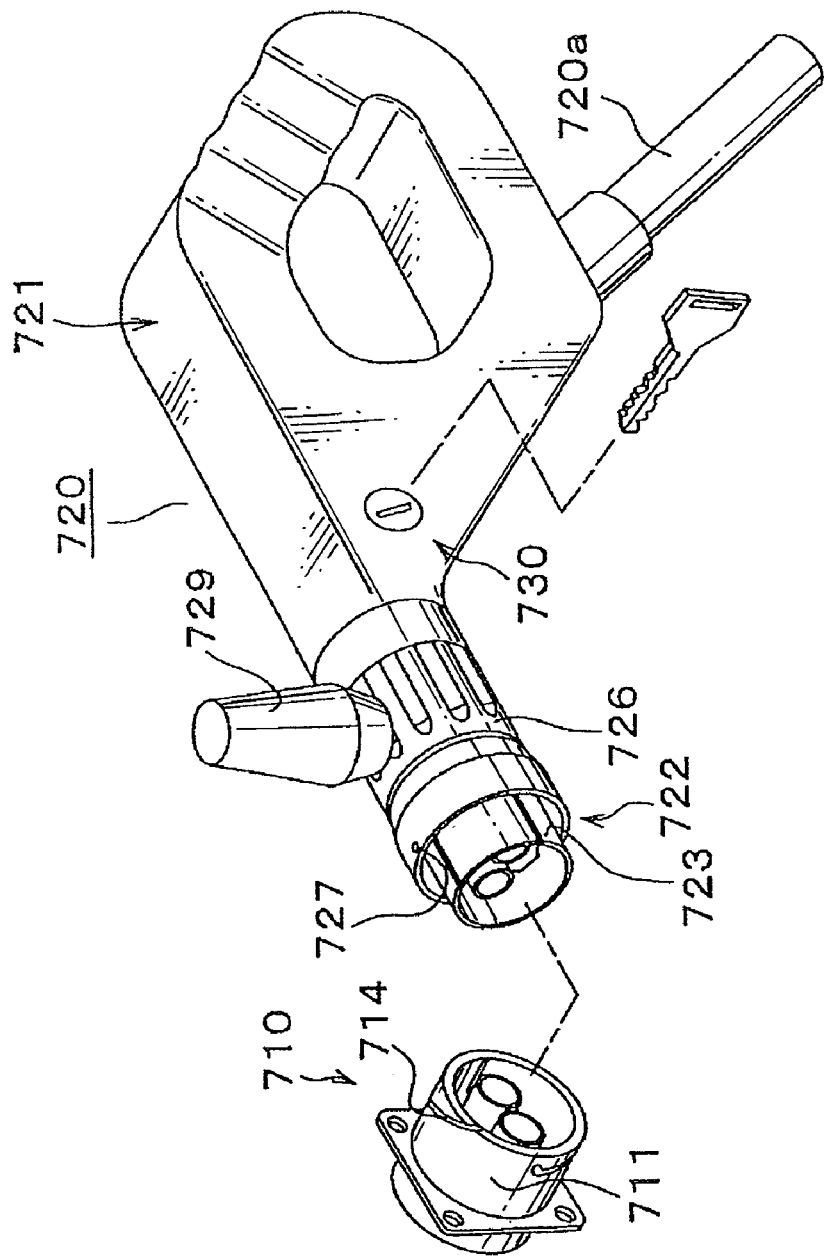
[FIG. 10] A perspective view showing a conventional charging connector.
Figure 11:
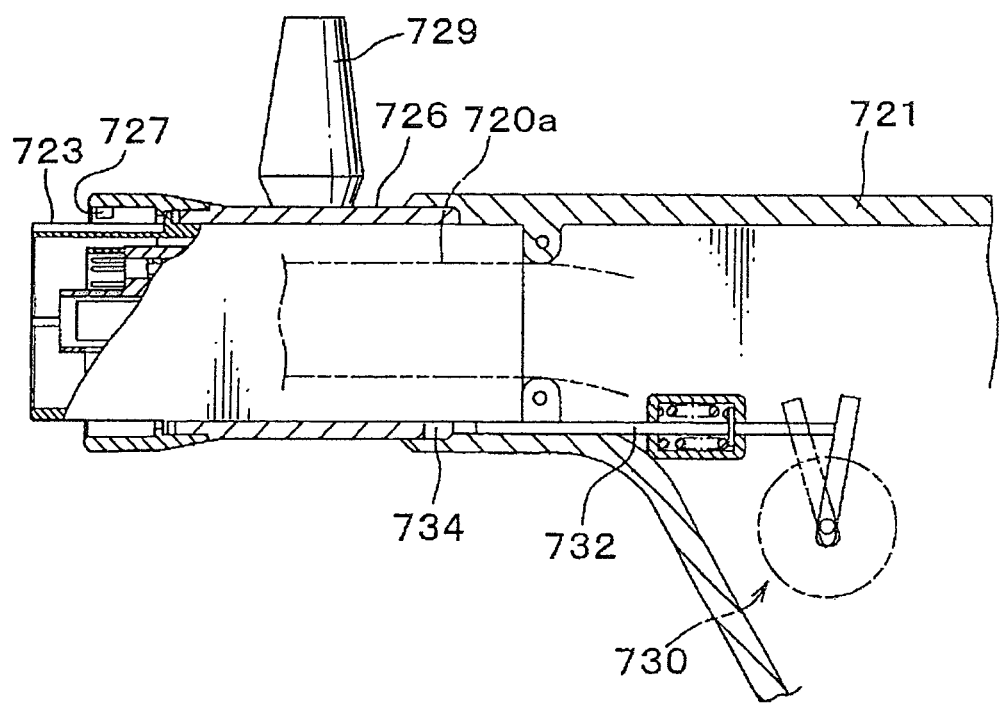
[FIG. 11] A vertically sectional view showing the charging connector of FIG. 10.

Further, a dial lock including: a dial into which a number as a code is inputted; and a number memory in which a checking number for checking against the number inputted in the dial is previously stored, and to be unlocked when the number inputted in the dial is checked against the checking number stored in the number memory, and they are matched may be used as the lock device. FIG. 9 shows the feeding-side connector B2 having such a dial lock.

As shown in FIG. 9, the feeding-side connector B2 includes: a dial lock 107 instead of the cylinder lock 101; and a not-shown linear actuator disposed at a lower side of the pushing part 46a having a cylinder main body fixed to the case main body 23 and an arm part projected from and retracted into the cylinder main body. The dial lock 107 is composed of a dial part 107a into which three-digit number is inputted, and a not-shown microcomputer (hereinafter referred to as "μCOM"). The μCOM includes a center processing unit (CPU), ROM and RAM, and is connected to the linear actuator. An arbitrary decided number (namely, checking number) is previously stored (registered) in the ROM. The CPU of the μCOM monitors the energizing state of the charging circuit. When the feeding-side connector B1 and the receiving-side connector A is completely fitted together, and the charging circuit is started to be energized, the μCOM sends a signal to the linear actuator to project the arm part from the cylinder main body, and to make a tip end of the arm part abut on the bottom wall 46b of the pushing part 46a to prevent the pushing part 46a from being pushed down (namely, the locking state). Further, when the number is inputted into the dial part 107a, the CPU of the μCOM compares the inputted number with the checking number stored in the ROM. When they are matched, the CPU sends a signal to the linear actuator to retract the arm part into the cylinder main body to remove the tip end of the arm part from the bottom wall 46b of the pushing part 46a to allow the pushing part 46a to be pushed down (namely, unlocking state). Incidentally, the linear actuator corresponds to the operation regulator in claims. The ROM in the μCOM corresponds to the code memory in claims. Further, the checking number corresponds to the checking code in claims.

Thus, the lock system includes the dial lock 107 as the lock device, and the dial lock 107 is unlocked by inputting the number. Therefore, a person to unlock the dial lock 107 is limited to a person knowing the previously stored checking number. The feeding-side connector B2 is prevented from being removed from the receiving-side connector A by anyone else having a malicious intent. Incidentally, in the embodiment described above, the CPU monitors the energizing condition of the charging circuit to automatically make the lock in the locking state. However, the present invention is not limited to this. When the inputted number is matched with the checking number stored in the ROM, the lock may become the locking state.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:
1. A charging connector comprising:
a connector case main body;
a lever received in the connector case main body, and of which center part is pivotally supported;
a locking claw integrally formed with one end of the lever; and
a release button disposed at the other end of the lever,
wherein when the charging connector is completely fitted into a secondary battery-side connector connected to a secondary battery, the locking claw is locked with a locking projection provided at the secondary battery-side connector, and wherein when the release button is pushed down, the lever is rotated around a shaft supporting point to release the locking between the locking claw and the locking projection, and the charging connector further comprising:

a lock system having a lock device attached to the connector case main body, and an operation regulator which is moved to a preventing position to prevent the release button from being pushed down when the lock device is in a locking state, and moved to an allowing position to allow the release button to be pressed down when the lock device is in an unlocking state.

2. The charging connector as claimed in claim 1, wherein the lock device is a cylinder lock operable to be unlocked by an ignition key of a vehicle.

3. The charging connector as claimed in claim 1, wherein the lock device is a biometric lock including: a biological data input into which biological data is inputted; and a biological data memory in which biological data for verifying to be checked against the biological data inputted in the biological data input is previously stored, and wherein the lock device is configured to be unlocked when the biological data inputted in the biological data input is checked against the biological data for verifying stored in the biological data memory, and they are matched.

4. The charging connector as claimed in claim 1, wherein the lock device is a dial lock including: a dial into which a code is inputted; and a code memory in which a checking code for checking against the code inputted in the dial is previously stored, and to be unlocked when the code inputted in the dial is checked against the checking code stored in the code memory, and they are matched.

5. The charging connector as claimed in any one of claims 1 to 4, wherein a locking wall of the locking claw abutting on the locking projection when the locking claw is locked with the locking projection is extended at not more than a right angle relative to a fitting direction to the secondary battery-side connector, and wherein the locking claw and the shaft supporting point of the lever are respectively arranged along the fitting direction when the locking claw is locked with the locking projection.

* * * * *